United States Patent

Weber et al.

[15] 3,668,080
[45] June 6, 1972

[54] METHOD OF PRODUCING SEPARATING NOZZLES

[72] Inventors: Klaus Weber, Pforzheim; Erwin Becker, Karlsruhe; Werner Grosstuck, Pforzheim, all of Germany

[73] Assignee: Klaus D. Weber, Pforzheim, Germany

[22] Filed: Feb. 18, 1970

[21] Appl. No.: 12,265

[30] Foreign Application Priority Data

Feb. 21, 1969    Germany..................P 19 08 693.2
Oct. 14, 1969    Germany..................P 19 51 639.3

[52] U.S. Cl. .................................204/9, 29/157 C, 29/423, 29/493, 29/497.5, 29/527.2, 55/17, 55/434
[51] Int. Cl..................C23b 7/02, B21d 53/00, B01d 57/00
[58] Field of Search.................29/157 C, 423, 424, 527.2, 29/527.4; 204/9, 3, 4

[56] References Cited

UNITED STATES PATENTS

| | | | |
|---|---|---|---|
| 2,493,661 | 1/1950 | Espersen | 204/9 |
| 2,608,529 | 8/1952 | Varian | 204/9 |
| 3,044,160 | 7/1962 | Jaffee | 29/423 |
| 3,105,285 | 10/1963 | Favre | 204/9 |
| 3,343,250 | 9/1967 | Berto et al. | 29/423 |
| 3,424,657 | 1/1969 | Fialkoff | 204/9 |
| 3,467,583 | 9/1969 | Naimer | 264/81 |
| 3,595,025 | 1/1971 | Stockel | 29/157 C |
| 3,613,207 | 10/1971 | Malburg | 29/423 |

Primary Examiner—John H. Mack
Assistant Examiner—T. Tufariello
Attorney—Michael S. Striker

[57] ABSTRACT

A method of producing separating nozzles with slot-shaped nozzle-channels of a very high degree of accuracy for separating gaseous or vaporous substances into particles of different molecular weights, this method consisting of first producing a thin molding bar which consists of a material which may be easily melted or chemically dissolved and is made of a size and shape exactly corresponding to those of the inner surfaces of two walls of the nozzle channel which consist of strips of a very thin sheet metal which are applied upon and thus molded to the shape of this bar. Small partitions of sheet metal are also inserted into the molding bar which, when the nozzle walls are completed and the material of the molding bar is completely removed, remain between and thereby reinforce the nozzle walls.

30 Claims, 11 Drawing Figures

PATENTED JUN 6 1972 3,668,080

INVENTOR.
KLAUS HEBER
ERWIN BECKER
WERNER GROSSKICK

BY
Michael S. Striker
AHorn.

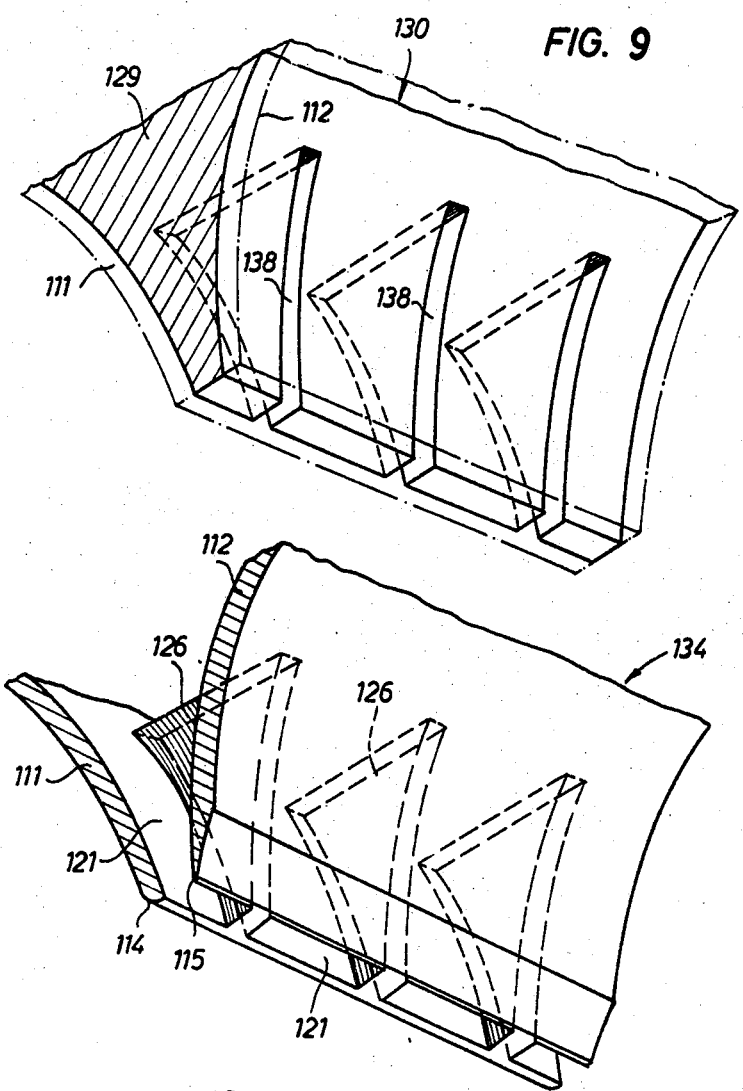

METHOD OF PRODUCING SEPARATING NOZZLES

The present invention relates to a method of producing separating nozzles which are to be employed especially in a method for separating gaseous or vaporous substances of different molecular weights, such as isotopes or the like, and are provided with nozzle walls defining slot-shaped nozzle channels, and especially with nozzle walls of an extremely small thickness, wherein one wall of each pair terminates into a rounded edge and the other wall into a sharp bladelike edge.

Such a so-called separating-nozzle method as disclosed by Professor Becker consists in conducting the gaseous or vaporous substances to a separating nozzle along the outside thereof on which they are passed under a very high pressure along a guide channel which curves around the rounded edge at the end of one nozzle wall which has a very small radius of curvature and then around the sharp, bladelike edge at the end of the other nozzle wall. The particles of the gaseous or vaporous substances of a greater molecular weight then pass under the centrifugal action of the flow of these particles along the radially outer side of the curved guide channel past the sharp edge of the second wall, while the particles of a lower molecular weight pass radially inward into the nozzle slot between the two nozzle walls. The width of the entire nozzle amounts only to a fraction of a millimeter, while the thickness of the sharp bladelike edge of the second wall is of a microscopic size of a few thousands of a millimeter. By connecting many of such nozzles in series in a cascade formation it is possible to attain a very extensive separation of the substances, for example, isotopes of the same substance, into particles of different molecular weight, and to attain a very high output with a nozzle system of very small dimensions. The result which may be attained by this method is the better the smaller the dimensions of each separating nozzle are made, that is, the sharper the angle is made at which the gases or vapors are deflected and the higher their pressures are made with which they are conducted to each separating nozzle.

The effects of such a nozzle depend extremely upon the tolerances with which the nozzle ends may be made, that is especially the sharp bladelike edge of the second nozzle wall and also the opposite rounded guide edge of the first wall over which the gases or vapors are conducted, and they also depend upon the tolerances of the cross-sectional sizes of the guide or deflecting channel and of the nozzle slot between these edges. Since the nozzle slots preferably have a great length, for example, of 1 to 2 m and more, the manufacture of such separating nozzles could previously be carried out only with extreme difficulties because of the very small dimensions of the nozzle parts and the necessity of maintaining the tolerances of these dimensions within the $\mu$ range and because the nozzle walls have to be very exactly rectilinear and should not be bent while being machined.

These difficulties have in the past been so serious that it has hardly been possible to produce separating nozzles of the type as above described economically and especially for high gas pressures. Therefore, despite the great advantage of the separating nozzle method which are due especially to the small space which it requires, this method could so far be carried out with a sufficient output only with great difficulties.

It is an object of the present invention to overcome these difficulties, and for attaining this object it is an important feature of the present invention to produce the desired nozzle walls by first producing a molding bar on which the nozzle walls are to be molded and which is made of a cross-sectional size and shape corresponding to those of the nozzle slot and a considerable part of which consists of a filling material which may again be removed from the finished nozzle walls by a nonmechanical operation which does not affect the nozzle material. Another feature of the invention consists in applying strips of the nozzle material upon both lateral sides of the mentioned molding bar so as to form the two walls of the nozzle channel which are connected to each other and reinforced by sheet-metal partitions and by the filling material between these partitions. Finally, the invention consists in removing the filling material by the mentioned nonmechanical operation from the completed nozzle walls including the reinforcing partitions.

Further objects of the invention consist in further improving and simplifying the aforementioned method. Thus, for example, the partitions which project through the filling material may be produced either prior to or simultaneously with the application of the metal strips which form the walls of the nozzle channel. If the partitions are produced in the first manner, they may be partly punched out of and bent upwardly from a supporting plate so as to form a row of individual tabs which are spaced from each other, and these spaces between the tabs may then be filled out with a filling material to form a continuous molding bar.

A further object of the invention consists in producing such a molding bar which is composed primarily of a filling material in such a manner that this bar will have such a solidity that, when machining the partitions or the nozzle walls to the required shape and dimensions, it is possible to maintain extremely small tolerances of these parts and to prevent the metal strips which are molded on the molding bar so as to form the nozzle walls from being bent inwardly between the individual partitions.

The invention further concerns particular manners of applying the nozzle walls upon the molding bar and of completing them so as to have the desired shape, and the manner of producing the partitions which connect and reinforce the walls of the nozzle channel. The invention further includes the possibility of producing these walls either together with or without the connecting and reinforcing partitions by a galvanic process, that is, by a process which is always herein to be understood also to include a galvanoplastic process.

Another very important feature of the invention consists in employing the filling material itself as the support for the connecting partitions so that a separate supporting plate or similar element which carries these partitions may be omitted. The partitions may then be molded or cast into the filling material and be rigidly secured to the nozzle walls when the latter are applied upon and molded on the molding bar. According to another embodiment of the invention, the molding bar may be produced as a continuous bar or strip and be provided with slots into which the connecting partitions may then be inserted. The molding of the partitions or their insertion into the molding bar is always carried out before the nozzle walls are applied. For securing the partitions more firmly to the filling material, they may be clamped in and/or glued to this material.

Another possibility of attaining the partitions consists of producing them in slots which are provided in the molding bar in the same operation in which the nozzle walls are produced, for example, by a galvanic process. The filling material which is to be employed according to the invention for producing the molding bar is preferably a nonmetallic material such as casting resins or a casting metal which may be removed from the nozzle walls without leaving any traces and without impairing the nozzle material. It is especially of advantage when the filling material itself serves as a support of the partitions to employ a metal which may be easily melted or chemically dissolved. The use of a light metal or alloy thereof is of particular advantage since it is sufficiently solid so as to serve as a molding support and has a sufficiently low melting point or is easily chemically attacked so as to permit it to be removed completely from the respective areas so as to form therein the nozzle channel when the separating nozzle is completed.

For producing the nozzle itself, many different kinds of material may be employed. Especially suitable for this purpose are metals which are highly resistant to heat or to chemicals, such as rolled bronze, nickel, nickel alloys, steel, for example, chrome-nickel steel, or precious metals or alloys thereof. Copper or copper alloys are also very suitable, especially if the nozzle walls and possibly the connecting partitions as well are produced galvanically.

Despite the tiny size of the nozzle elements, the method according to the invention permits such elements to be made economically even in a mass production with nozzle walls which are spaced at very accurate distances from each other exactly as desired and are practically free of tension.

A further object of the invention consists in providing a separating nozzle which is produced in accordance with the inventive method. Because of the high degree of accuracy with which this nozzle is made, there is no need to provide any additional means, for example, in the form of hooks, for supporting the nozzle walls or their separating edges on the outer guide wall, except the individual partitions which reinforce these walls of the central slot-shaped nozzle channel.

Another feature of the invention consists in producing a separating nozzle of an extremely high degree of accuracy and uniformity along its length also insofar as the guide or deflecting channel is concerned which is formed between a guide or deflecting wall forming a U-shaped groove, and especially the end portions of the two nozzle walls which terminate into a rounded guide edge and into a sharp bladelike edge, respectively. This high degree of accuracy and uniformity is attained according to the invention by uniformly spacing the ends of the nozzle walls from the guide wall by providing within the guide or deflecting channel adjacent to the two mentioned edges of the nozzle walls a plurality of spacing elements which are spaced from each other in the longitudinal direction of the channel and are secured to the guide wall and provided with recesses which have a shape in accordance with the ends of the two nozzle walls and are adapted to receive and support these ends. By providing these spacing elements it is possible to insure that the main nozzle element which forms the slot-shaped nozzle channel will be held in a very accurate position relative to the guide wall by being centered by the individual spacing elements which therefore prevent the nozzle element from being laterally offset relative to the surrounding inner U-shaped surface of the guide wall.

The spacing elements preferably consist of individual pins which are inserted into the element in which the guide wall is formed and which are provided with the recesses for receiving the ends of the channel walls of the nozzle element. In order to facilitate the insertion of these ends of the nozzle walls into the recesses in the spacing elements, the outer ends of these recesses are preferably beveled outwardly.

Although the spacing elements may be spaced at any desired distances from each other, these distances should not be too large so as not to impair the required rigidity of the nozzle element. The spacing pins which may have a diameter of, for example, 1 mm may therefore be spaced from each other at distances of approximately 4 to 10 mm, although if desirable these distances may also be either smaller or larger.

The spacing elements may be inserted into the support in which the U-shaped guide wall is provided by being pressed, soldered, welded or glued into the same. They may, however, also be built up on the guide wall by a galvanic or galvanoplastic process or form integral parts of the material of the the support of the guide wall, for example, by being punched, stamped or drawn toward the outside of this wall.

The features and advantages of the present invention will become more clearly apparent from the following detailed description thereof which is to be read with reference to the accompanying drawings, in which FIG. 1 shows a very highly enlarged cross section of a separating nozzle which is produced in accordance with the inventive method;

FIG. 2 shows a perspective view of the result of a first stage of the inventive method of producing a separating nozzle as shown in FIGS. 1 and 1a;

FIG. 9 shows a perspective view of a part of a bar-shaped supporting element for the connecting partitions which consists of a filling material;

FIG. 10 shows a perspective view of a part of a nozzle element which is produced by employing the supporting element according to FIG. 9.

Figure 1:
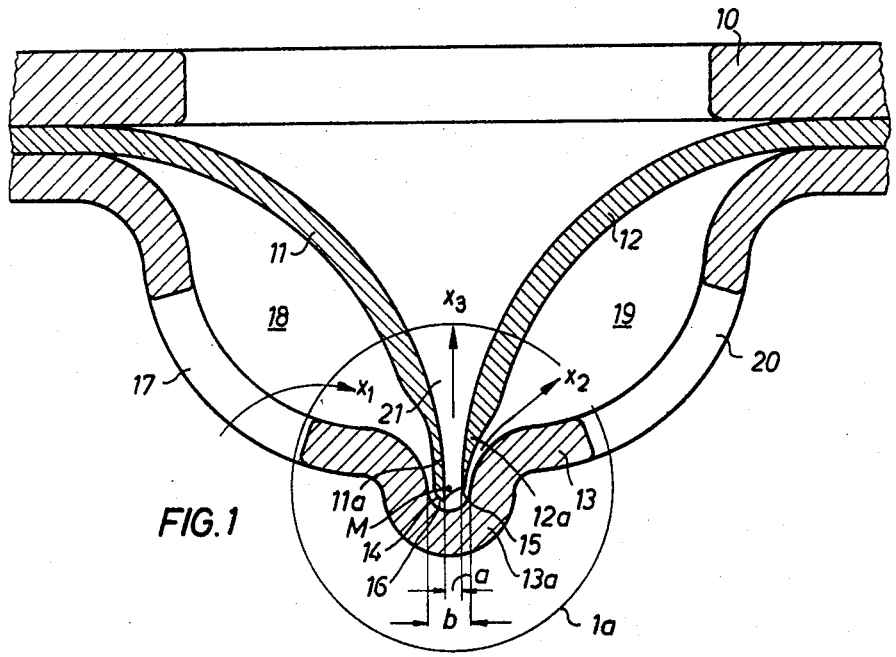
FIG. 1a shows a still more highly enlarged cross section of the part of the separating nozzle which is indicated by the circle 1a in FIG. 1.
Figure 1A:
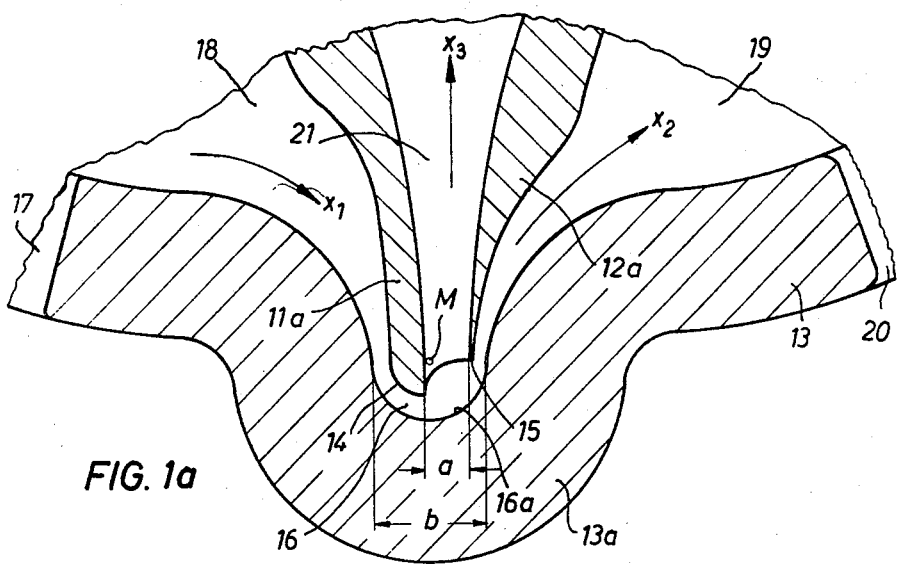

As illustrated in FIG. 1 of the drawings, a supporting element 10 in the form of a base plate carries the two inner walls 11 and 12 of a nozzle channel and an outer guide wall 13. The nozzle walls 11 and 12 are immovably clamped between the supporting element 10 and the guide wall 13 or they are rigidly secured to these parts in any other suitable manner. The nozzle walls 11 and 12 and the guide wall 13 have a very great length, for example, 1 to 2 m or more, as compared with the other very small dimensions of the nozzle. Walls 11 and 12 consist of a high-grade material which has the property that it will not be affected by a thermal or chemical treatment which is employed for removing the filling material after the nozzle walls 11 and 12 are completed.

The end portion 11a of the nozzle wall 11 has a reduced thickness and terminates in a rounded edge 14, while the end portion 12a of the opposite nozzle wall 12 is ground so as to terminate into a sharp bladelike edge 15. These lower edges of the end portions 11a and 12a of the two walls are spaced from each other at a certain distance $a$ which may amount, for example, to approximately 0.1 mm.

Adjacent to the end portions 11a and 12a of the nozzle walls the guide wall 13 is bent around these parts in the form of a U-shaped part 13a so that between the lower edges 14, 15 of the nozzle walls 11 and 12 and the inner wall surface 16a of the curved part 13a of guide wall 13 a U-shaped guide channel 16 of a width of, for example, approximately 0.02 to 0.03 mm is formed for the passage of the gaseous or vaporous substance. The entire width $b$ of the nozzle unit which is formed by the end portions 11a, 12a of the nozzle walls 11 and 12 and the curved guide channel 16 therefore amounts only to approximately 1/5 to 1/4 mm.

The gaseous or vaporous substance enters a longitudinal chamber 18 in the direction of the arrow $x$, through an aperture 17 in guide wall 13 and then passes through the guide channel 16 to the separating nozzle where the gas particles of a greater molecular weight are deflected by the second arm of the U-shaped inner surface of the curved part 13a of guide wall 13 and conducted in the direction of the arrow $x_2$ into the second longitudinal chamber 19 and through the aperture 20 in guide wall 13, while the particles of a lighter molecular weight penetrate inwardly toward the center of curvature M of guide channel 16 and are conducted by the separating edge 15 in the direction of the arrow $x_3$ into the slot-shaped nozzle channel 21.

By connecting a large number of such separating nozzles in a cascade series behind each other it is possible to attain an extensive, practically complete separation of the lighter particles from the heavier particles.

FIGS. 2 to 7 illustrate in detail the method of producing the nozzle walls 11 and 12 and of attaining the rounded and bladelike edges 14 and 15 on these walls.

Figure 2:
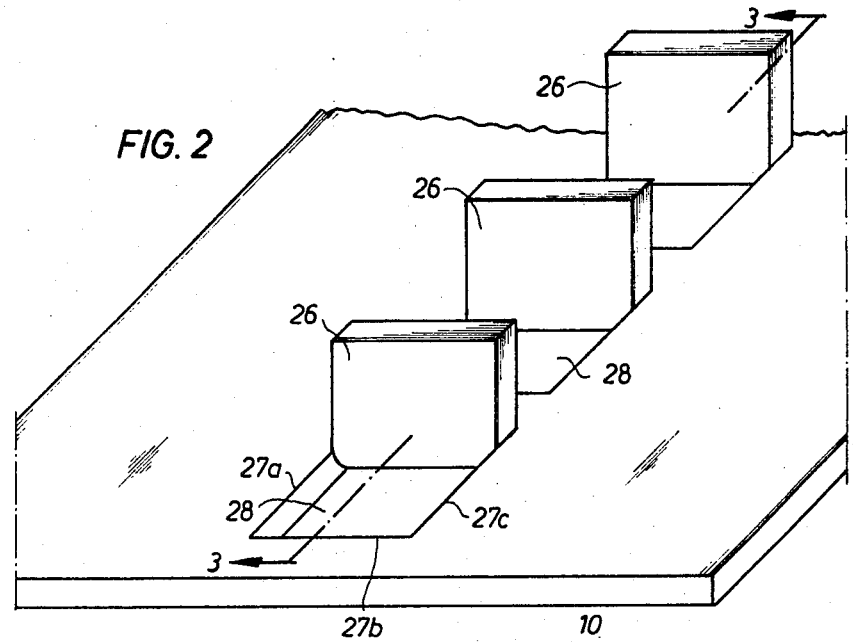
Figure 3:
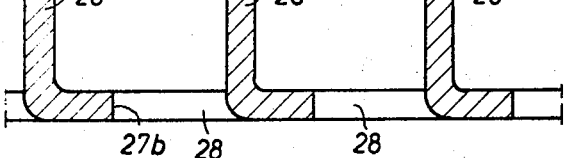
FIG. 3 shows a cross section which is taken along the line 3—3 of FIG. 2.

As shown in FIGS. 2 and 3, separate tabs 26 are first punched out at three sides 27a, 27b and 27c from the base plate 10 which serves as a supporting element, while the fourth side of each tab 26 remains connected to the base plate. These tabs are bent upwardly so as to extend vertically to the base plate so that adjacent to each tab an aperture 28 is formed which is defined by these three sides of the aperture and one side of the adjacent upwardly bent tab.

Figure 4:
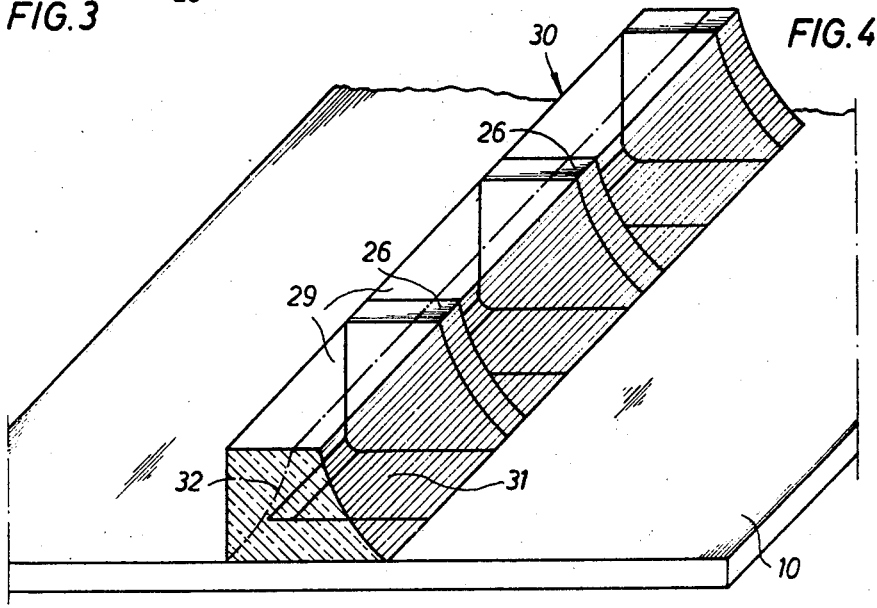
FIG. 4 shows a perspective view of the result of a second stage of the inventive method.

A filling material 29 is then inserted and preferably poured between the upwardly bent tabs 26 so that a continuous bar-shaped projection or molding bar 30 is formed, as indicated in FIG. 4, which has a length equal to that of the subsequent separating nozzle and has at first a rectangular cross-sectional shape corresponding to that of the upwardly bent tabs 26 as shown in FIG. 2. The apertures 28 in plate 10 are preferably also filled out by the filling material. Bar 30 therefore forms a solid unit consisting of the filling material and the tabs 26 which form partitions between the individual sections of filling material.

The filling material preferably consists of casting resins or casting metals, that is, materials which may later again be removed by a thermal or chemical treatment without leaving any traces and without affecting the nozzle material, i.e., the material of the nozzle walls 11 and 12 and preferably also the material of the tabs or partitions 26. This filling material should have the highest possible solidity.

The upwardly projecting bar 30 which is thus formed is then machined at both lateral sides, for example, by milling or grinding, so that its outer shape will exactly correspond to the inner cross-sectional shape of the subsequent slot-shaped nozzle channel 21.

In FIG. 4, one lateral side of bar 30 is illustrated in full lines as having already been finished so as to form a curved surface 31, while its opposite lateral side still needs to be machined so as to form the curved surface 32, as indicated in dot-and-dash lines.

Figure 5:
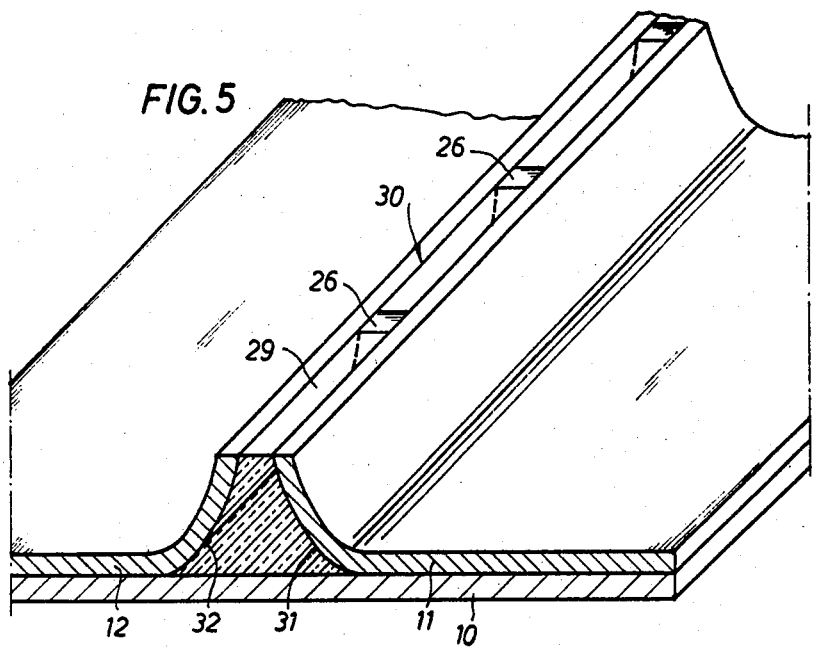
FIG. 5 shows a perspective view of the result of a third stage of the method.

FIG. 5 shows the molding bar 30 which is produced in this manner and consists of the partitions 26 and the filling material 29, and it also illustrates the result of a further stage of the method in which the nozzle walls 11 and 12 are applied tightly upon the curved surfaces 31 and 32 of bar 30. These nozzle walls consist of thin strips of sheet metal which are pressed by means of suitable tools tightly against the bar 30 so as to be molded exactly in accordance with the prescribed shape and position of the slot-shaped nozzle to be produced. The compressive forces which are applied in molding the metal strips to the required shape of the nozzle walls 11 and 12 are taken up by the bar 30.

Figure 7:
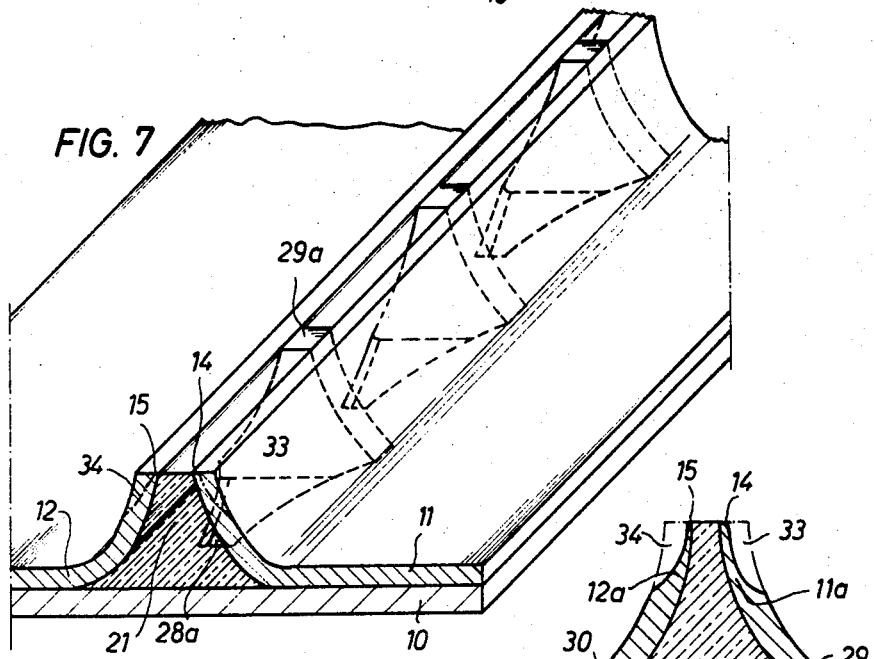
FIG. 7 shows a perspective view of the result of the fourth stage of the method as shown in FIG. 6 but provided with certain structural modifications.
Figure 6:
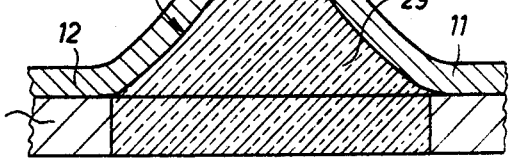
FIG. 6 shows a cross-section of the result of a fourth stage of the method.

Unless the upwardly bent ends of the nozzle walls 11 and 12 have not already been given their final shape by a previous operation, they may now be milled or ground to the shape as shown in FIGS. 6 and 7. In this operation the rounded edge 14 on the end portion 11a of the nozzle wall 11 and the sharp edge 15 on the blade-shaped end position 12a of the nozzle wall 12 are also formed by the removal of the parts 33 and 34 of the material. The working pressure is taken up in this operation again by the partitions 26 and the filling material 29 of the bar 30 so that the very thin wall portions 11a and 12a will not be damaged and the nozzle walls after being installed in the nozzle unit will accurately comply with extremely small tolerances.

After the nozzle has been so far completed, the filling material is removed by an operation which depends upon the kinds of filling material and nozzle material which are employed, for example, by heating the unit 10 to 12 to a temperature higher than the melting temperature of the filling material 29 or by chemically dissolving the filling material and separating it from the nozzle material so that only the nozzle material together with the base plate 10 and the partitions 26 remain and the slot-shaped nozzle channel 21 is formed between the nozzle walls 11 and 12. The final result is illustrated in FIG. 7 in which, however, it is assumed that the machining of the lateral surfaces 31 and 32 of bar 30 as described with reference to FIG. 4 to attain their curved shape may be partly or entirely omitted since the partitions 29c are already given their final shape when being punched out of the base plate 10, whereby the apertures 28a are also formed in the base plate. Of course, the outer curved surfaces of bar 30 may also in this case be subjected to a finishing treatment.

Figure 8:
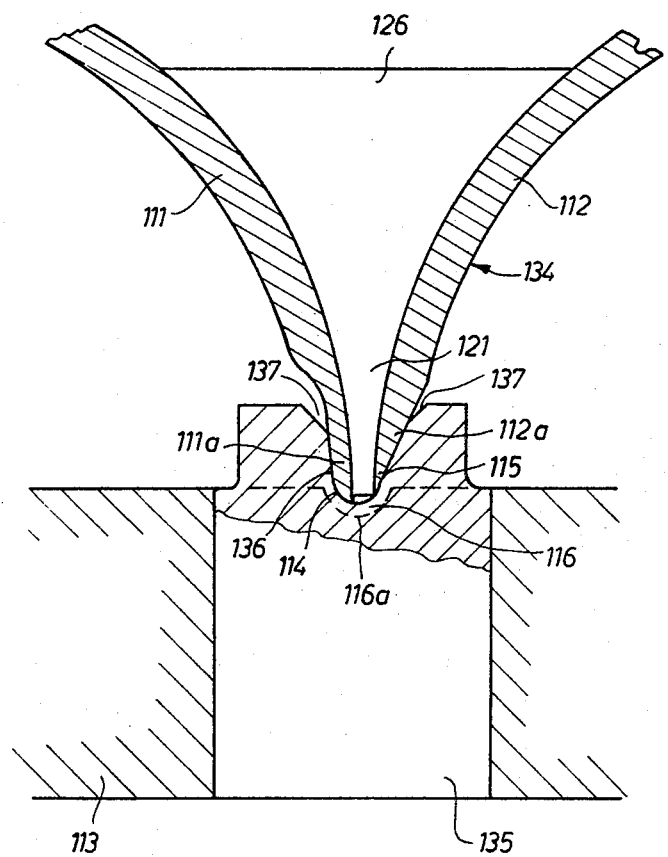
FIG. 8 shows a cross section of a part of another embodiment of the separating nozzle which is produced according to the invention.

In the modification of the invention as illustrated in FIGS. 8 to 10, those parts which correspond to the parts as described with reference to the embodiments as previously described are designated by the same reference numerals which, however, are increased by 100. The nozzle walls 111 and 112 of a nozzle element 134 which extend vertically to the plane of FIG. 8 and define a slot-shaped nozzle channel 121 are reinforced and braced on each other by connecting partitions 126 which are spaced from each other in the longitudinal direction of this channel and the end portions 111a and 112a of which terminate in the form of a rounded guide edge 114 and a sharp bladelike edge 115, respectively. The nozzle element 134 may be secured at its upper end to a supporting wall or the like in a similar manner as described with reference to the first embodiment. The guide groove 116a is formed in and supported by a wall portion 113 and extends in the longitudinal direction of the nozzle element 134, that is, in the direction vertical to the plane of FIG. 8. The ends 111a and 112a of the nozzle walls 111 and 112 engage so far into the guide groove 116a that between these ends and the upper surface of groove 116a a guide channel 116 is formed.

For mounting the nozzle element 134 in an accurately centered position relative to the wall portion 113 and the guide wall which is formed by the guide groove 116a, and for thus insuring that channel 116 will have a cross-sectional size exactly as desired between the surface of guide groove 116a and the surfaces of the rounded edge 114 and the blade edge 115, several pin-shaped spacing elements 135 are inserted at suitable distances from each other into the element 113 in which the guide groove 116a is provided. The upper end of each of these spacing elements 135 as shown in FIG. 8 is provided with a recess 136 which is made of a cross-sectional shape corresponding to that of the ends 111a and 112a of the nozzle element 134, and the upper ends 137 of these recesses 136 are outwardly bevelled to permit the nozzle element 134 to be more easily inserted. The spacing elements 135 are preferably provided at equal distances from each other and within the same planes in which the partitions 126 are located so that the nozzle element 134 will be supported along its entire length by these spacing elements 135.

FIG. 9 illustrates a section 130 of a bar-shaped element which consists of a filling material 129, preferably a light metal, for example, aluminum, and inversely corresponds to the shape of the nozzle element 134, that is, to the shape of the nozzle channel between the nozzle walls 111 and 112. This bar-shaped element 129 is provided with separate slots 138 which have a shape in accordance with the shape of the partitions 126 and are spaced from each other in accordance with the distances between these partitions which are then inserted tightly into the slots 138 and secured to the walls of the latter by an adhesive. Subsequently, that is, usually after the lateral sides of bar 130 which consists of the filling material and contains the tabs 126 have been machined and finished so as to comply with the final shape of the nozzle channel, the thin sheet-metal strips 111 and 112, as indicated in dot-and-dash lines in FIG. 9, are applied thereon in the same manner as described with reference to the first embodiment of the invention. Finally, by a suitable machining of the end portions 111a and 112a of the nozzle walls 111 and 112 these end portions and the rounded edge 114 and the sharp edge 115 on them are given the desired shape, whereupon the filling material is removed nonmechanically, for example, by melting it or by chemical action. FIG. 10 illustrates diagrammatically a section of the nozzle element 134 which is thus produced.

If the nozzle walls of either embodiment of the invention are produced by a galvanic or galvanoplastic process, their final shape may also be attained by a suitable masking. However, even in this case it is usually necessary to subject the nozzle walls to a finishing treatment in order to attain the required accuracy of the rounded edge 14 or 114 and of the sharp edge 15 or 115.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. A method of producing separating nozzles for separating gaseous or vaporous substances of different molecular weights, each of said nozzles having a slot-shaped nozzle channel defined by a pair of walls terminating at the nozzle opening into very thin end portions, comprising the steps of first producing a molding bar of a size and shape corresponding to the inner cross section of said nozzle channel and at least substantially consisting of a filling material, then applying strips of a nozzle material upon both lateral sides of said molding bar so as to form said two nozzle walls thereon, producing a plurality of partitions at least at the time when applying said nozzle walls, said partitions extending through said filling material transversely to said bar and adapted to connect said nozzle walls to each other, said filling material being adapted to be removed nonmechanically from said nozzle walls and said partitions and without affecting the same, and then removing said filling material in said manner from said nozzle walls and said partitions.

2. A method as defined in claim 1, in which said filling material is removed by thermal action from said nozzle walls and said partitions.

3. A method as defined in claim 1, in which said filling material is removed by chemical action from said nozzle walls and said partitions.

4. A method as defined in claim 1, in which said partitions are produced before said strips are applied upon said molding bar.

5. A method as defined in claim 1, in which said partitions are secured to a supporting element so as to project therefrom and to be disposed in a row behind each other, whereupon the spaces between the adjacent partitions are filled out with said filling material so as to form said molding bar containing said partitions.

6. A method as defined in claim 5, in which said partitions are produced by being partly punched out of and erected from said supporting element so that each partition remains connected to said supporting element at one side extending transverse to said row and is bent about said side so as to project from said supporting element.

7. A method as defined in claim 6, in which when said spaces between said adjacent partitions are filled out with said filling material, the apertures formed in said supporting element when said partitions are partly punched out therefrom are likewise filled out with said filling material.

8. A method as defined in claim 1, in which said strips are applied upon said molding bar so as to adhere thereto.

9. A method as defined in claim 1, in which said strips are produced by a galvanic process on said molding bar.

10. A method as defined in claim 1, further comprising the step subsequent to the application of the strips upon said molding bar of finishing one of said strips so that its end portion terminates into a thin separating edge.

11. A method as defined in claim 1, in which said strips forming the walls of said nozzle channel including the very thin edges of the ends of said walls are applied upon said molding bar in the form of a rolled sheet metal after it has been rolled substantially to its final shape.

12. A method as defined in claim 1, in which said filling material forms the support of said partitions in said molding bar.

13. A method as defined in claim 12, in which said partitions are inserted into said filling material and are firmly connected to said walls of said nozzle channel.

14. A method as defined in claim 1, in which said partitions are embedded in said filling material.

15. A method as defined in claim 1, in which a continuous bar of said filling material is made and then provided with slots into which said partitions are inserted.

16. A method as defined in claim 1, in which said filling material consists of a nonmetallic material such as casting resins.

17. A method as defined in claim 1, in which said filling material consists of a casting metal.

18. A method as defined in claim 1, in which said walls of said nozzle channel consist of a chemically resistant metal.

19. A method as defined in claim 1, in which said walls of said nozzle channel consist of a metal having a high melting point.

20. A method as defined in claim 1, in which said walls of said nozzle channel consist of a metal containing nickel at least as an alloy component.

21. A method as defined in claim 1, in which said walls of said nozzle channel consist of a metal containing a precious metal at least as an alloy component.

22. A method as defined in claim 4, in which said partitions and said filling material when combined so as to form said molding bar are machined together to the size and shape corresponding to the inner cross section of said nozzle channel.

23. A method as defined in claim 9, in which when producing said strips forming the walls of said nozzle channel by a galvanic process the very thin parts of said walls are attained by masking.

24. A method as defined in claim 13, in which said partitions are inserted into said slots in said filling material before the strips are applied upon said molding bar.

25. A method as defined in claim 12, in which said partitions are inserted into said filling material so as to adhere thereto.

26. A method as defined in claim 15, in which said partitions are formed in said slots in said filling material together with the formation of said nozzle walls.

27. A method as defined in claim 26, in which said partitions and said nozzle walls are produced together by a galvanic process.

28. A method as defined in claim 12, in which said filling material consists of a casting metal.

29. A method as defined in claim 12, in which said filling material consists of a metallic material containing a light metal at least as a component.

30. A method as defined in claim 9, in which said walls of said nozzle channel consist of a metal containing copper at least as an alloy component.

* * * * *